United States Patent [19]
Yasuda et al.

[11] Patent Number: 5,353,277
[45] Date of Patent: Oct. 4, 1994

[54] OPTICAL DISK HAVING INTERTRACK HEAT CONDUCTION SUPPRESSION

[75] Inventors: Kouichi Yasuda, Tokyo; Atsushi Fukumoto; Masumi Ono, both of Kanagawa, all of Japan

[73] Assignee: Sony Corporation, Tokyo, Japan

[21] Appl. No.: 958,007

[22] Filed: Oct. 8, 1992

[30] Foreign Application Priority Data

Oct. 14, 1991 [JP] Japan .................................. 3-264609

[51] Int. Cl.⁵ ............................................. G11B 7/24
[52] U.S. Cl. ................................. 369/275.4; 369/277
[58] Field of Search ................. 369/275.4, 275.1, 277, 369/280, 283, 272, 284; 365/120, 127

[56] References Cited

U.S. PATENT DOCUMENTS

| | | | |
|---|---|---|---|
| 4,731,755 | 3/1988 | Bjorklund et al. | 365/127 |
| 4,983,505 | 1/1991 | Higuchi et al. | 430/495 |
| 5,115,424 | 5/1992 | Nakajima et al. | 369/275.4 |
| 5,199,023 | 3/1993 | Yamamoto et al. | 369/275.4 |

FOREIGN PATENT DOCUMENTS

| | | | |
|---|---|---|---|
| 2152034 | 6/1990 | Japan | 369/275.4 |
| 3292632 | 12/1991 | Japan | . |

*Primary Examiner*—Paul M. Dzierzynski
*Assistant Examiner*—James Beyer
*Attorney, Agent, or Firm*—Limbach & Limbach

[57] ABSTRACT

To increase the track density, that is, to improve the recording density of the optical disk of ultra-high resolving power reproduction type, grooves 4 are formed in a transparent substrate 2; phase pits 1 are formed on groove bottom portions 5 and land portions 6 of the grooves; and further a material layer 3 is laminated. A polycarbonate substrate is used as the transparent substrate 2. The material layer 3 is formed of such a material that the state is partially changed due to heat of the reading light in the optical spot of the reading light but returned to the original state after the reading light has passed, and in addition the reflection factor of the material is changeable according to the state change. The material layer 3 is a ternary compound of $Ge_2Sb_2Te_3$. The thermal conductivity of the transparent substrate 2 is smaller than that of the material layer 3. The temperature of the material layer 3 rises in the laser spot according to the light intensity distribution of the laser, so that the reflection factor changes partially to enable data read operation. The heat conduction suppression due to the presence of the stepped portions of the grooves 4 sharpens the temperature gradient, so that the range in which the reflection factor is increased due to the state change of the material layer 3 can be reduced, thus decreasing the track interval distance and thereby increasing the track density.

2 Claims, 5 Drawing Sheets

1: PHASE PIT
SP
2: SUBSTRATE
3: MATL LAYER
SPOT WIDTH

TEMP
MP

DISTANCE IN TRACK DIR

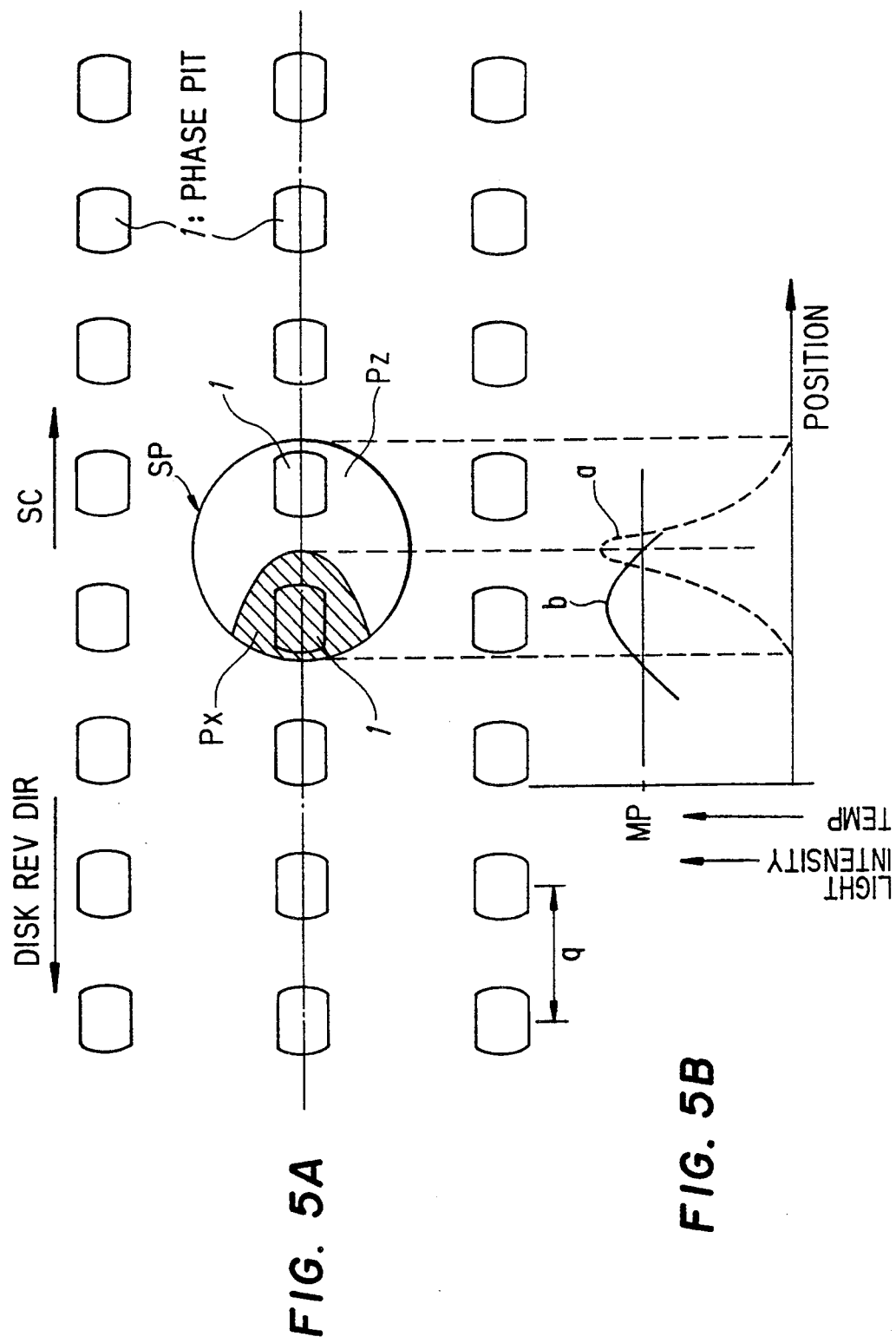

OPTICAL DISK HAVING INTERTRACK HEAT CONDUCTION SUPPRESSION

BACKGROUND OF THE INVENTION

1. Field of the Invention

The present invention relates to an optical disk suitable for use in a high density recording, in which phase pits are formed in a transparent substrate. A material layer, whose reflection factor is changeable according to the temperature, is formed on the transparent substrate.

2. Background of the Art

A digital audio disk (i.e. compact disk) or an optical disk (e.g. video disk) is composed of an aluminum reflection film formed on a transparent substrate in which phase pits have been previously formed according to information signals, and a protecting film formed on the aluminum reflection film.

In the optical disk as described above, signals are read out or reproduced from the disk by irradiating a reading light upon the disk surface so as to detect a remarkable decrease in the quantity of the reflected light caused by the diffraction on the disk surface in which phase pits are formed.

In the conventional optical disk as described above, the resolving power in the signal reproduction can be almost determined by the wavelength $\lambda$ of a light source of the reproducing optical system and the numerical aperture NA of an objective lens, and the reproduction limit is determined by the spacial frequency of $2 NA/\lambda$.

Therefore, in order to realize an optical disk of higher density, it is indispensable to decrease the wavelength $\lambda$ of the light source (e.g. semiconductor laser) of the reproducing optical system and further to increase the numerical aperture NA of the objective lens.

However, there exists a limit, as a matter of course, in improvement of the wavelength $\lambda$ of the light source and the numerical aperture NA of the objective lens, so that it is difficult to increase the recording density remarkably, in practice.

To overcome the above-mentioned problem, the same applicant has already proposed an optical disk which can realize a high resolving power beyond the above-mentioned limit determined by the wavelength $\lambda$ and the numerical aperture NA, by changing the reflection factor on the basis of change in the partial phase within a scanning spot of the reading light, as disclosed in Japanese Patent Application Nos. 2-94452 and 3-249511.

FIG. 4 is a cross-sectional view showing an example of this optical disk, in which a material layer 3 crystallizable after having been melted is formed on a flat transparent substrate 2 on which phase pits 1 are formed in accordance with information signals.

In this optical disk, when a reproducing laser light, for instance is applied onto the material layer 3, a temperature distribution is produced within the scanning spot of the reading light. Therefore, the material layer 3 is locally melted from the crystal state to reduce the reflection factor, and then returned to the original crystal state in the steady state after reading operation.

The irradiation of the reproducing laser light upon the optical disk shown in FIG. 4 will be described in further detail with reference to FIG. 5.

In FIG. 5(A), a laser spot SP is scanned in the arrow direction SC when the disk is being rotated. In the drawing, the respective phase pits 1 are arranged at the shortest possible recording period q. However, this arrangement of intervals and the pit length change of course according to the recording data.

Further, in FIG. 5(B), the abscissa indicates the position of the laser spot SP in the scanning direction SC. Under the condition that the laser spot SP is irradiated upon the optical disk as shown in FIG. 5A, the intensity of the laser spot SP distributes as shown by a dashed curve a. On the other hand, the temperature on the material layer 3 of the optical disk distributes as shown by a solid curve b, which is slightly delayed from the intensity of the laser spot SP according to the scanning speed of the laser spot SP.

Here, as described above, when the laser spot SP is scanned in the scanning direction SC as shown in FIG. 5A, the temperature at the laser spot SP on the optical disk increases gradually from the start end side along the scanning direction of the laser spot SP, and exceeds the melting point MP of the material layer 3.

At this stage, the material layer 3 changes from the initial crystal state to a melted state, so that the reflection factor drops. Therefore, there exist two regions, that is, a region $P_x$ (shown by a shaded portion in FIG. 5A) in which the reflection factor is low and therefore a phase pit 1 is not readable and another region $P_z$ in which the reflection factor is high due to the crystal state and therefore the phase pit 1 is readable.

Therefore, as shown in FIG. 5A, even if there are two phase pits 1 within the same laser spot SP, for instance, it is possible to read data from only one phase pit 1 existing in the high reflection factor region $P_z$. Consequently, it is possible to read data with an ultra-high resolving power without being subjected to the limit determined by the wavelength $\lambda$ of the reading light and the numerical aperture NA of the objective lens, thus enabling a high density recording.

Further, in the above-mentioned optical disk (FAD type), the reflection factor is low when the material layer 3 is in the melted state and high when in the crystal state. However, it is also possible to construct the material layer 3 in such a way that the reflection factor is high in the melted state and low in the crystal state, according to the selection of various conditions (structure, thickness, etc.) of the material layer 3. In the optical disk (RAD type) as described above, data is readable from only the region (refer to the shaded portion in FIG. 5A) in which the material layer is in the melted state and therefore the reflection factor increases. That is, in both the RAD and FAD types, it is possible to read data with an ultra-high resolving power and therefore to realize a high density recording.

In the above-mentioned optical disk (referred to as SR disk) where the material layer 3 is formed on the transparent substrate 2 on which phase pits 1 are arranged, the spread of the heat flow in the track direction has not so far taken into account.

Therefore, in the case of the RAD type SR disk, it has been to practice to keep the track intervals separated beyond the radius of the reading optical spot, to such an extent that the track is not susceptible to change in the reflection factor of the adjacent track, in order to prevent crosstalk between two adjacent tracks due to change in the reflection factor, thus raising a problem that the track density will not be increased to realize higher density recording.

SUMMARY OF THE INVENTION

With these problems in mind, therefore, it is the primary object of the present invention to provide an optical disk of high track density for realizing a higher recording density.

To achieve the above-mentioned object, in the optical disk according to the present invention, recording pits optically readable according to information signals are formed in a transparent substrate; a material layer whose reflection factor is changeable according to temperature is formed on the transparent substrate; and heat conduction suppressing means are interposed between the respective tracks at which the recording pits are formed.

In the optical disk according to the present invention constructed as described above, the heat flow in the track direction can be suppressed, and therefore the range in which the reflection factor changes according to temperature change can be narrowed. Consequently, it is possible to reduce the intervals between the respective tracks and therefore to improve the track density and therefore the recording density.

BRIEF DESCRIPTION OF THE DRAWINGS

FIG. 5 is an illustration for assistance in explaining the relationship between the light intensity distribution of the laser spot and the temperature distribution of the optical disk as shown in FIG. 4.

DETAILED DESCRIPTION OF THE PREFERRED EMBODIMENTS

Figure 1:
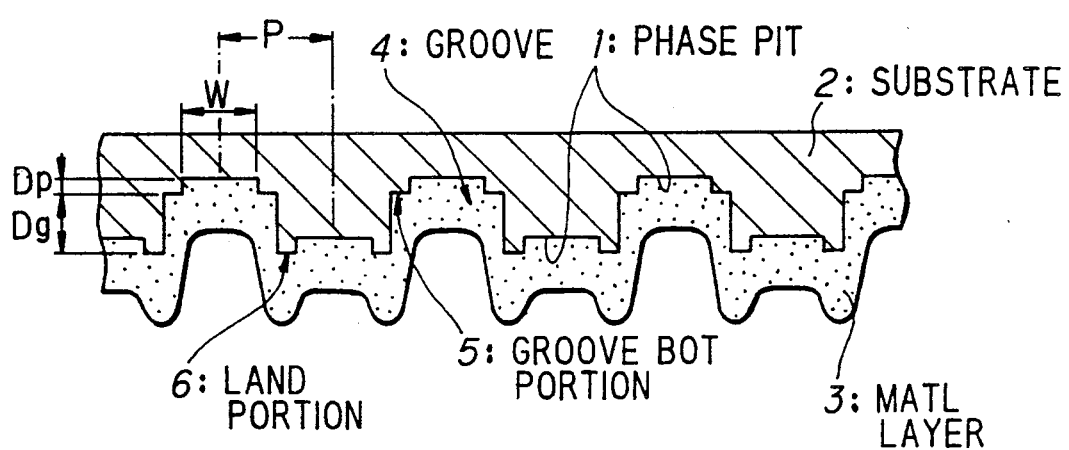
FIG. 1 is a cross-sectional view showing an essential portion of an embodiment of the optical disk according to the present invention.
Figure 4:
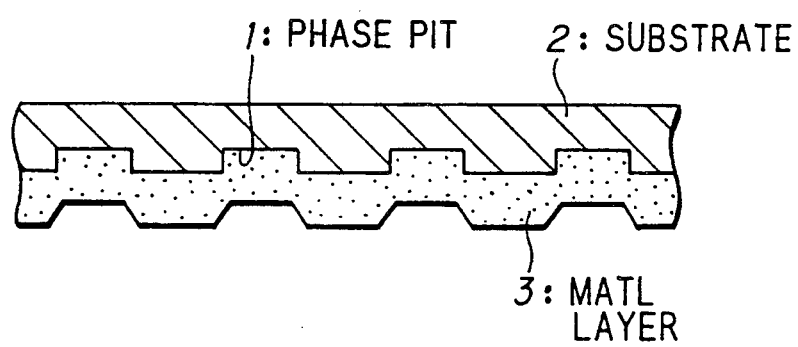
FIG. 4 is a cross-sectional view showing an essential portion of another comparative example of the optical disk.

An embodiment of the optical disk according to the present invention will be described hereinbelow with reference to FIG. 1. In FIG. 1, the same reference numerals have been retained for similar parts or elements which have the same functions as with the case of the optical disk previously described with reference to FIG. 4.

In this embodiment, grooves 4 are formed in a transparent substrate 2, and phase pits 1 are formed on groove bottom portions 5 and land portions 6 according to information signals. Further, a material layer 3 is laminated on the transparent substrate 2 in which the phase pits 1 are formed as described above.

In this embodiment, the transparent substrate 2 is formed of polycarbonate. The thermal conductivity of the transparent substrate 2 is 0.0040 J/cm. sec. deg.

Further, the optical disk is formed as follows: The track pitch is P=0.8 μm; the pit depth is $D_p$=120 nm; the pit width is W=0.3 μm; and the depth of the grooves 4 is $D_g$=0.4 μm.

Further, it is also possible to form the transparent substrate 2 of acryl based resin, polyolefin based resin, glass, etc.

Further, any material can be adopted as the material layer 3 as far as the following conditions can be satisfied: the state can be changed locally by heat of the reading light within the reading light spot, and then returned to the original state after the reading light has passed. In addition, the reflection factor thereof changes according to the state change.

Here, the state change implies a change such that material changes with the melting point (from crystal to liquid, or from amorphous to liquid) as a boundary. In this case, the material which changes from the crystal state to the liquid state is preferable, because the change in the reflection factor is generally large.

The materials which can satisfy the above-mentioned conditions are a simple substance or a two or more mixture of Se, Te, Bi, Ce, Sb, Pb, Ga, Ge, Sn, In, etc. Further, in this embodiment, a ternary compound of $Ge_2 Sb_2 Te_3$ is used by way of example as the material layer 3. The thermal conductivity of this material layer 3 is 0.05812 J/cm. sec. deg.

Figure 2A:
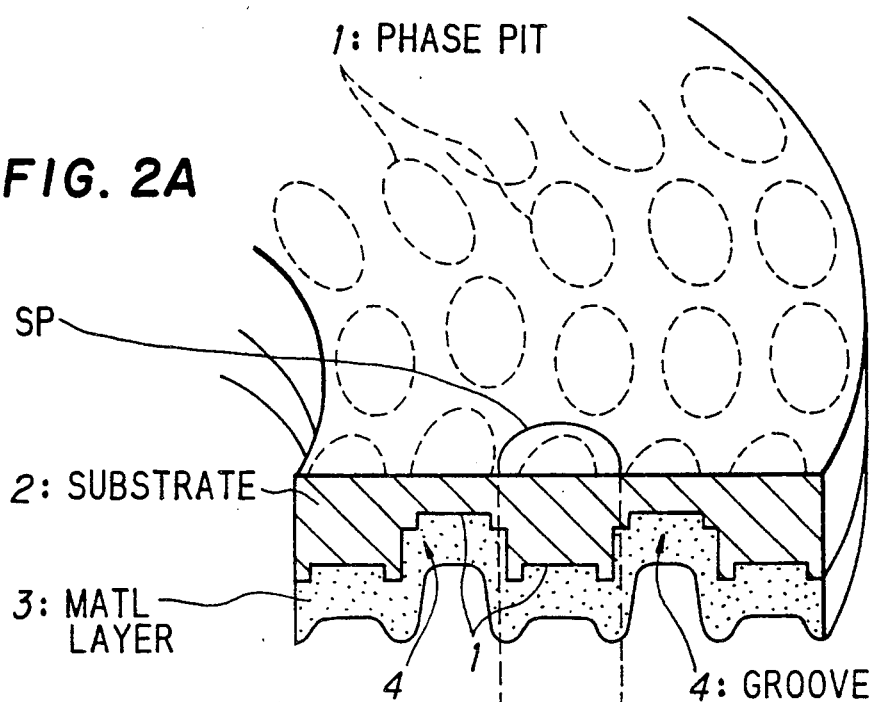
FIG. 2 is an illustration for assistance in explaining the temperature distribution obtained when a laser light is irradiated upon the embodiment of the optical disk formed with grooves as shown in FIG. 1.
Figure 2B:
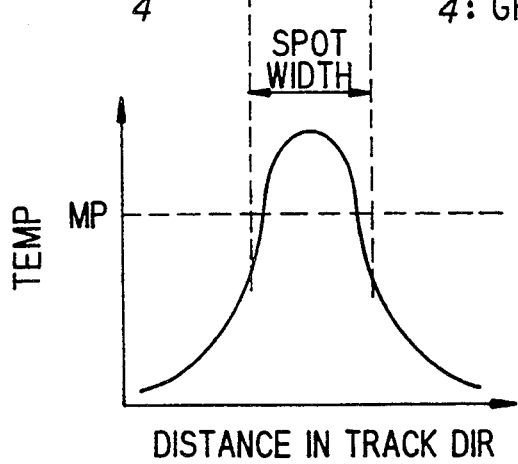

When a laser light is applied onto the optical disk formed as described above (as shown in FIG. 2A), the temperature within the laser spot SP rises according to the light intensity distribution (as shown in FIG. 2B). Subsequently, the reflection factor increases at the position where the temperature exceeds the melting point MP of the material layer 3, thus enabling information reading. In the this embodiment, accordingly the optical disk is of RAD type SR disk.

In the above-mentioned embodiment, it should be noted that the temperature gradient in the track direction is sharp as shown in FIG. 2B. The reason is as follows:

As already described, the thermal conductivity of the transparent substrate 2 is smaller than that of the material layer 3. Therefore, the heat generated by the laser light is diffused mostly in the material layer 3.

In this embodiment, however, since the grooves 4 are formed in the transparent substrate 2, the material layer 3 is formed on and along the concave and convex portions of the groove bottom portions 5 and the land portions 6 along the track direction. Here, in general, in the case where a semiconductor laser is focused through a lens, the light intensity distribution can be approximated by Gaussian distribution. Further, the thermal hysteresis first follows the light intensity distribution and then diffuses three-dimensionally.

Accordingly, in the optical disk having the transparent substrate 2 formed with the grooves 4, the thermal conduction of the heat in the track direction can be suppressed by the presence of the concave and convex portions of the groove bottom portions 5 and the land portions 6 obtained when the grooves 4 are formed in the transparent substrate 2. In other words, the thermal conduction is virtually retarded as compared with the optical disk formed with the flat transparent substrate 2 (without any grooves), with the result that the temperature gradient can be sharpened.

As described above, in the embodiment of the present invention, since the range at which the reflection factor increases according to the state change of the material layer 3 can be narrowed in the track direction, even if the track interval distance (track pitch P) is reduced as compared with the track interval distance of the flat transparent substrate, it is possible to read data reliably from the optical disk without generating any crosstalk between the two adjacent tracks, that is, to increase the track density. In other words, in the temperature distribution shown in FIG. 2B, since the range in which the reflection factor of the material layer 3 changes mainly can be narrowed below the width of the laser spot SP, it is possible to reduce the track interval distance to such a narrow extent that the phase pit 1 of the adjacent track can be located within the range in the laser spot SP at which the reflection factor does not change sharply.

Figure 3A:
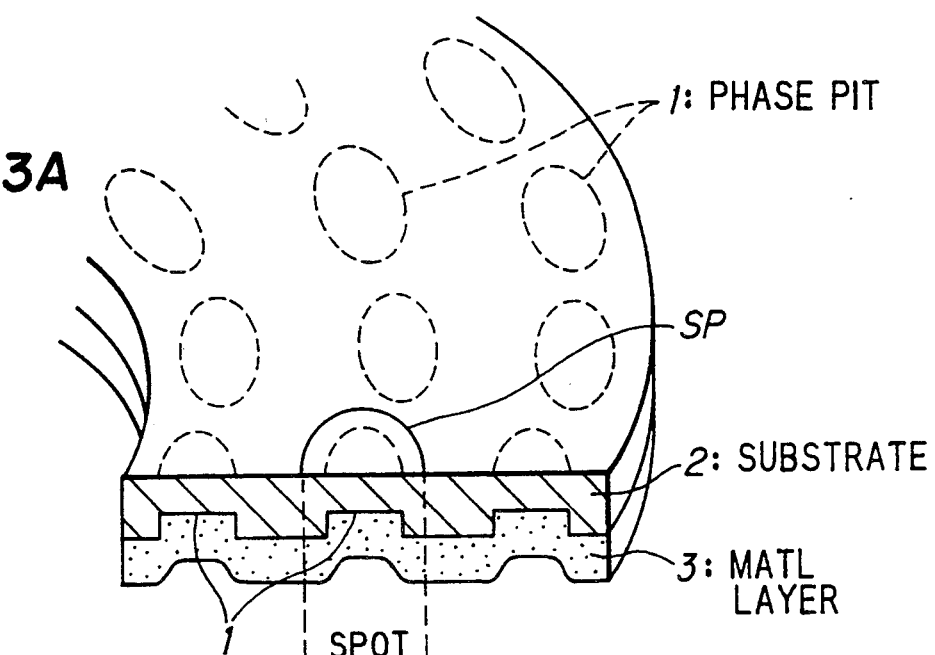
FIG. 3 is a similar illustration for assistance in explaining the temperature distribution obtained when a laser light is irradiated upon a comparative example of the optical disk formed with no grooves.
Figure 3B:
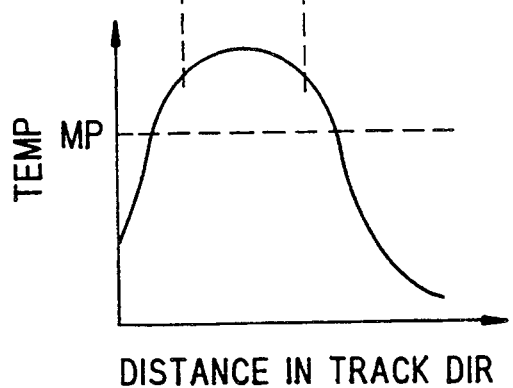

Further, the optical disk shown in FIG. 3A is formed in the same way as that shown in FIGS. 1 and 2A, except that the track pit P is different and no grooves 4 are formed as compared with the afore-mentioned embodiment. In this comparative optical disk, when the laser light is applied onto the disk in the same way as in FIG. 2, since the transparent substrate 2 is formed with no grooves 4, there exists no heat conduction suppressing effect, so that the temperature distribution in the track direction is widened gradually as shown in FIG. 3B.

Consequently, since the range in which the reflection factor increases according to the state change of the material layer 3 can be widened in the track direction, it is necessary to increase the track interval distance (track pitch P), as compared with the embodiment as shown in FIGS. 1 and 2, in order to prevent the crosstalk between the two adjacent tracks. In other words, in the temperature distribution shown in FIG. 3B, since the range in which the reflection factor of the material layer 3 changes mainly is widened beyond the width of the laser spot SP, it is necessary to increase the track interval distance to such a wide extent that the phase pit 1 of the adjacent track cannot be located within the laser spot SP.

Accordingly, in the case of the optical disk as shown in FIG. 3A, it is impossible to increase the track density as with the case of the optical disk as shown in FIGS. 1 and 2A.

Further, in the above-mentioned embodiment, although the phase pit 1 is formed both on the groove bottom portion 5 and the land portion 6, it is of course possible to form the phase pit 1 only on any one of them. In this case, since the width of the surface (bottom or land portion) on which the phase pit 1 is not formed can be much reduced, it is possible to further increase the track density in that degree.

In the above-mentioned embodiment, the grooves 4 are formed in the transparent substrate 2 to suppress the thermal conduction between the respective tracks. Alternatively, it is also possible to interpose heat insulating members between the respective tracks of the material layer 3 instead of the material layer or to remove the material layer 3 between the respective tracks by etching process. That is, the gist of the present invention is to provide heat conduction suppressing means or function between the respective tracks of the material layer 3.

Further, in the above-mentioned embodiment, although the phase pits 1 are formed on the transparent substrate 2, without being limited thereto, it is of course possible to apply the present invention to other optical disks in which any kinds of recording pits are formed in such a way that data can be read optically.

As described above, in the optical disk according to the present invention, since the heat conduction suppressing means or function is provided between the respective tracks, it is possible to suppress the spread of heat flow in the track direction, so that the range in which the reflection factor changes according to temperature change can be narrowed. Subsequently, the interval distance between the tracks can be reduced and therefore the track density can be increased for providing a higher recording density.

What is claimed is:

1. An optical disc comprising:
   a transparent substrate formed with recording pits optically readable according to information signals;
   a material layer formed on said transparent substrate, the reflection factor of said material layer being changeable according to temperature; and
   heat conduction suppressing means interposed between respective tracks along which the recording pits are formed; said suppressing means comprising groove bottom portions and land portions formed in said transparent substrate; and wherein the recording pits are formed on both the land and bottom portions, respectively, said land and bottom portions being obtained as a result of the formation of said grooves in said transparent substrate.

2. The optical disk of claim 1, wherein the thermal conductivity of said transparent substrate is smaller than that of said material layer.

* * * * *